United States Patent [19]

Shu

[11] Patent Number: 4,678,032

[45] Date of Patent: Jul. 7, 1987

[54] POLYMER AND METHOD FOR PERMEABILITY PROFILE CONTROL UNDER SEVERE RESERVOIR CONDITIONS

[75] Inventor: Paul Shu, Princeton Junction, N.J.

[73] Assignee: Mobil Oil Corporation, New York, N.Y.

[21] Appl. No.: 866,634

[22] Filed: May 23, 1986

[51] Int. Cl.$^4$ ............................................ E21B 33/138
[52] U.S. Cl. ...................................... 166/295; 166/300; 523/130
[58] Field of Search ..................... 166/294, 295, 300; 523/130, 132; 405/264, 270

[56] References Cited

U.S. PATENT DOCUMENTS

| | | | |
|---|---|---|---|
| 2,252,271 | 8/1941 | Mathis | 166/295 |
| 2,652,379 | 9/1953 | Hedrick et al. | 405/264 X |
| 3,268,002 | 8/1966 | Fischer | 166/295 X |
| 3,554,287 | 1/1971 | Eilers et al. | 166/295 |
| 3,762,476 | 10/1973 | Gall | 166/294 |
| 3,782,467 | 1/1974 | Hessert | 166/295 X |
| 3,794,115 | 2/1974 | Skagerberg | 166/294 |
| 4,018,286 | 4/1977 | Gall et al. | 166/295 |
| 4,039,029 | 8/1977 | Gall | 166/294 |
| 4,040,484 | 8/1977 | Hessert | 166/294 |
| 4,105,618 | 8/1978 | Sifferman et al. | 166/295 X |
| 4,476,931 | 10/1984 | Boles et al. | 166/294 |
| 4,498,540 | 2/1985 | Marrocco | 166/295 |
| 4,512,407 | 4/1985 | Friedman | 166/295 |
| 4,569,395 | 2/1986 | Carpenter | 166/294 X |

FOREIGN PATENT DOCUMENTS 2145420A 3/1985 United Kingdom .

*Primary Examiner*—George A. Suchfield
*Attorney, Agent, or Firm*—Alexander J. McKillop; Michael G. Gilman; Charles J. Speciale

[57] ABSTRACT

A method and composition for treating subterranean formation by reducing formation permeability by injecting into the formation through a well bore, a first polymer solution including a polymer selected from the group consisting of poly(vinylalcohol-co-vinylcarboxyl),

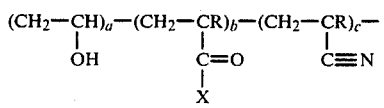

poly(vinylalcohol-co-vinylether),

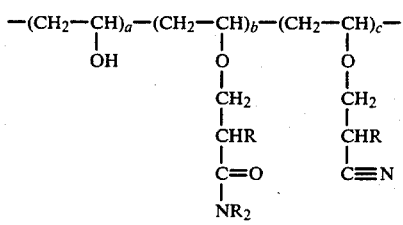

wherein:

R is H, alkyl, alkyl sulfonate or aryl groups having not more than 10 carbon atoms;

X is $NR_2$, OH, OR, $O^-$, alkylammonium, or alkylsulfonate; and a, b, and c are mole fractions of each co-monomer unit such that $a+b+c=1$, $a>0$, and $b>0$, which is crosslinked with an ion selected from the group consisting of multivalent transition metals of the Group IIIa-VIa, VII, and Ib-Vb of the Periodic Table.

8 Claims, No Drawings

POLYMER AND METHOD FOR PERMEABILITY PROFILE CONTROL UNDER SEVERE RESERVOIR CONDITIONS

BACKGROUND OF THE INVENTION

The present invention relates to improving the permeability characteristics of a substerranean formation, and, in particular, to a polymeric material which can provide a stable gel at severe reservoir conditions.

Subterranean oil producing formations generally have variable permeability. In zones where permeability stratification exists, the waterflooding or other displacing fluid used in producing oil sweeps fastest through the more permeable zones so that much of the oil in the less permeable zones must be produced at high water (fluid) to oil ratios.

Polymer gels have been used to control the reservoir permeability profile. Effective gels require good strength to withstand long-term flooding. Furthermore, these polymer gels should be able to withstand the severe conditions present in substerranean reservoirs during enhanced oil recovery. Specifically, the gels should be able to withstand the presence of high salt concentrations especially since most enhanced oil recovery processes include the use of field brines, and should be able to withstand high temperatures without breaking down. In addition to these characteristics, it is preferable that the polymeric gel be easy to prepare for injection into the formation through an introducing well.

Polymers and gels useful for permeability control, as described in the prior art, are generally homopolymers and random copolymers. These polymers generally form homogeneous solutions and uniform bulk gels when crosslinked.

It has been known to use polyacrylamide and xanthan gums which can be crosslinked by a metal in order to improve profile control in waterflooded wells. Polyacrylamides, however, display instability in the presence of high brine concentration at temperatures over 70° C. Xanthan gums, on the other hand, are very brine tolerant but display thermal instability, even at temperatures below 60° C.

In view, therefore, of the severe reservoir conditions which include both high brine concentrations and elevated temperatures, there is a need for brine tolerant, thermally-stable materials suitable for high temperature wells and steam flooded wells.

It has been known, for example, to use polyvinylalcohol (PVA) metal-crosslinked gels, as described in U.S. Pat. No. 3,762,476 to Gall, in order to correct subterranean formation permeability. See also U.S. Pat. No. 4,039,029 to Gall and U.S. Pat. No. 4,018,286 to Gall, et al. Unfortunately, polyvinylalcohol has a drawback in that it has very poor cold water solubility, and has to be dispersed in cold water as a suspension followed by heating to a temperature of for example, 90°-95° C. for dissolution. Furthermore, polyvinylalcohol also has the limitation that the choice of possible crosslinking metal components is limited, Titanium (IV) probably being the only practical choice. Other commonly used metals such as aluminum, chromium, and zirconium are not effective to crosslink polyvinylalcohol. Furthermore, polyvinylalcohol gels crosslinked with titanium are not brine stable at high temperatures. In particular, syneresis can occur, i.e., the contraction of the gel on standing with exudation of a liquid, which detracts from predictable, stable profile control in the formation.

Polyvinylalcohol can also be crosslinked covalently, however, with polyaldehydes as described in Patent Application by Marrocco, et al., GB No. 2,145,420 A. The gelation described in the Marrocco, et al. disclosure, however, requires an acidic environment, creating a need for controlling the pH of the reservoir to facilitate the process. Needless to say, control of the reservoir environment at a particular pH can be a very difficult task. Regardless of the alternative crosslinking process described by Marrocco, et al., the polyvinylalcohol solution preparation problems remain and the gel stability in strong brine concentration is uncertain.

It is, therefore, an object of the present invention to provide a polymer gel for injection in a subterranean reservoir which has good thermal stability at high brine concentration.

It is a further object of the present invention to provide a highly stable polymeric gel composition which can be crosslinked with a variety of crosslinking metal ions.

It is still a further object of the present invention to provide a crosslinking gel composition which is easily prepared in a water solution without heating.

Yet another object of the present invention is to provide a polymeric gel composition which does not require control of the pH condition of the subterranean reservoir in order to effect crosslinking.

A further object of the present invention is to provide a profile control polymeric gel composition which is essentially nonhydrolizable.

SUMMARY OF THE INVENTION

The present invention is a method for treating a subterranean formation to provide permeability control, said formation penetrated by at least one well bore, which includes injecting into the formation through the well bore a polymer solution which includes a polymer selected from the group consisting of poly(vinylalcohol-co-vinylcarboxyl),

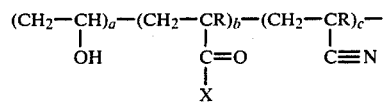

poly(vinylalcohol-co-vinylether),

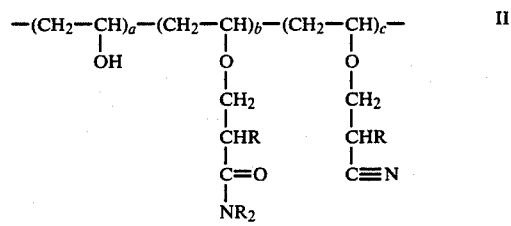

wherein:
R is H, alkyl, alkyl sulfonate, or aryl groups having not more than 10 carbon atoms;
X is $NR_2$, OH, OR, $O^-$, alkylammonium, or alkylsulfonate; and
a, b, and c, are mole fractions of each co-monomer unit such that $a+b+c=1$, $a>0$, and $b>0$,
followed by injecting a solution containing a complexing ion selected from the group consisting of multivalent transition metals of the Group IIIa–VIa, VIII, and Ib–Vb of the Periodic Table.

In a preferred embodiment the multivalent transition metals used as gelants can be Cu(II), Al(III), Cr(III), Ti(IV), Zr(IV) or mixtures thereof.

While the polymer concentration for proper gellation is dependent upon the polymer molecular weight, it has been found that the polymer can have a molecular weight of from about 50,000 to about 10,000,000, and that the concentration can be from about 0.1% to about 10% by weight. When the polymer weight is about 100,000 the preferred concentration is from about 2% to about 5%, and when the polymer weight is in the range of 1,000,000 the concentration can be from about 0.5% to about 5% by weight. The crosslinking agent needed for gellation can be included in an aqueous solution in an amount of from about 0.5 to about 10 wt% based on the polymer.

As a result of the present invention, a polymer results in which the main polymer chain consists of carbon-to-carbon covalent bonds only, which are more thermally and hydrolitically stable than the acetal linkages of polysaccharides, including xanthan gums. Moreover, both polymers of the present invention are essentially nonionic and nonhydrolyzable, and are very brine tolerant.

Furthermore, polymers I and II are more hydrophilic than polyvinylalcohol, which is aptly demonstrated by good cold water solubility. The resulting hydrogels prepared from these hydrophilic polymers also resist syneresis under high temperature and high salinity.

Moreover, as a result of using the polymers of the present invention, the practitioner has the broadest choice of metal crosslinkers, which lends to flexibility in choosing a actuating gelant.

For a better understanding of the present invention, together with other and further objects, reference is made to the following description and examples, and its scope will be pointed in the appended claims.

DETAILED DESCRIPTION OF THE INVENTION

In accordance with the present invention thermally stable gels resistive to degradation from high salt concentration can be prepared from polymers in which amide or carboxylic groups have been incorporated into polyvinylalcohol. The polymers can then crosslinked with a wide variety of metals. The resulting amide and carboxylic containing polyvinylalcohols are polymers which are very soluble in cold water thus simplifying the solution preparation procedure.

The amide and/or carboxylic groups can be introduced into the polyvinylalcohol by either direct copolymerization or by modifying polyvinylalcohol. When the amide and carboxylic groups are introduced into the polyvinylalcohol by direct copolymerization, a poly(-vinylalcohol-co-vinylcarboxyl) polymer can be produced which has Formula I:

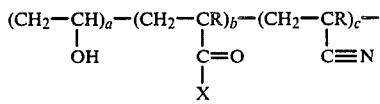

On the other hand, when the polyvinylalcohol is modified by etherifying polyvinylalcohol with acrylamide or substituted acrylamide, acrylates, acrylonitrile, acrylamidoalkyl sulfonate, the following polymer having Formula II can be produced.

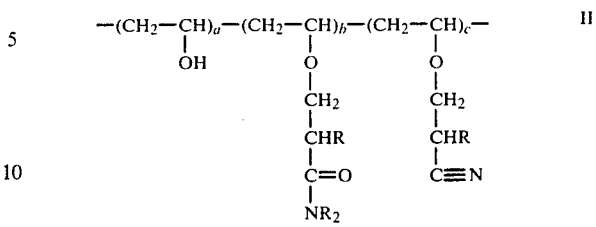

In either event, the substituents of the resulting polymer are as follows: R can be H, alkyl, or aryl groups having 10 carbons or less; X can be $NR_2$, OR, OH, $O^-$, alkylammonium, or alkylsulfonate; and a, b, and c are mole fractions of each co-monomer unit such that $a+b+c=1$ and $a>0$.

The synthesis of the polymer I can be carried out by free radical polymerization of vinylacetate and appropriate co-monomers, followed by hydrolysis.

Polymer II can be synthesized by etherifying polyvinylalcohol with acrylamide or substituted acrylamide, acrylamidoalkyl sulfonate, acrylates and acrylonitrile in the presence of an alkali.

In order to be effective, the molecular weight of these polymers should be 50,000 or higher, and are preferably over 100,000. Higher molecular weight polymer forms are desirable in gels at low polymer and crosslinker concentrations. Furthermore, the gels may be prepared from a mixture of the above-identified polymers.

A variety of water soluble multivalent transition metals may be used as gelants. In most cases Cu(II), Al(III), Cr(III), Ti(IV), Zr(IV), and mixtures thereof are useful. Other transition metals of the Group IIIa to VIa, VIII, Ib to Vb of the Periodic Table are useful.

EXAMPLE 1

In order to prepare the combination of the present invention, emulsion copolymerization of approximately 129 grams of vinylacetate and 12.9 grams of methylacrylate was conducted at 75° C. using 1.2 grams of sodium persulfate as an initiator, and 3.6 grams of Garfac RE611 (Trade name of GAF) as a surfactant. The polymerization resulted in a copolymer with a 10:1 mole ratio of vinylacetate to methylacrylate. Methanolysis was then conducted in methanol and sodium methoxide to produce poly(vinylalcohol-co-acrylate). This polymer was highly soluble in cold water and was crosslinkable with Ti(IV), Zr(VI), and Cr(III) to form hydrogels which are useful in permeability control in subterranean reservoir formations.

EXAMPLE 2

Another example of the present invention was prepared using 30 grams of 99% hydrolyzed polyvinylalcohol (having a molecular weight of approximately 100,000), which was reacted with 60 grams of acrylamide in 280 grams of water in 80° C. for one to eight hours. The polymer product was isolated by precipitating in methanol.

The resulting polymer was found to be soluble in cold water, and it formed a gel with Chromium, Titanium and Zirconium. In particular the resulting polymer was dissolved in a 15% brine solution containing 1000 ppm $Ca^{++}$, and 500 ppm $Mg^{++}$. Gels were formed using gelants in accordance with the formulas shown in Table I, which proved to be stable for at least 10 weeks at 212° F.

TABLE 1

| Polymer conc. wt % | Crosslinker, ppm | |
|---|---|---|
| .5 | Ti | 2000 |
| .5 | Ti | 1000 |
| 2.5 | Ti | 2000 |
| .5 | Zr | 2000 |
| .5 | Cr | 500 |
| 2.5 | Cr | 500 |

As can be seen from these results the gels produced by the polymers of the present invention demonstrate high temperature and brine stability.

In practicing the permeability control and enhanced oil recovery process of the present invention, in one embodiment, a mixture of the polymer solution and crosslinking solution is injected into a well into the subterranean formation. The mixture is directed to that portion of the subterranean formation where it is desired to alter the permeability found therein. After shutting off the well, for example, for about 16 to 48 hours, water injection is resumed. Variations of effecting permeability control include simultaneous injection of polymer and gelling agent as well as injection of polymer and gelant in series.

Thus, while there had been described what are presently believed to be the preferred embodiments of the invention, those skilled in the art will realize that changes and modifications may be made thereto. Without departing from the spirit of the invention, and it is intended to claim all such changes and modification as fall within the true scope of the invention.

What is claimed is:

1. Method for treating a subterranean formation by reducing formation permeability, said formation penetrated by at least one well bore, comprising:

a. injecting into the formation through said well bore a first polymer solution which includes a polymer

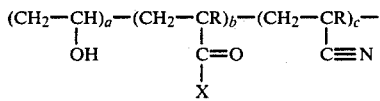
I poly(vinylalcohol-co-vinylether),

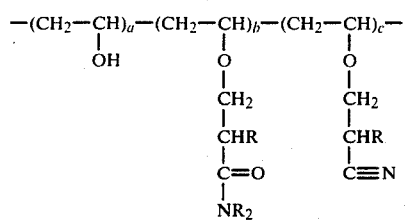
II wherein:

R is H, alkyl, alkyl sulfonate or aryl groups having not more than 10 carbon atoms;

X is $NR_2$, OH, OR, $O^-$, alkylammonium, or alkylsulfonate; and a, b, and c are mole fractions of each co-monomer unit such that $a+b+c=1$, $a>0$, $b>0$, and b. injecting a solution containing a complexing ion selected from the group consisting of multivalent transition metals of the Group IIIa–VIa, VIII, and Ib–Vb of the Periodic table.

2. The method of claim 1 wherein said polymer has a molecular weight of from about 50,000 to about 10,000,000.

3. The method of claim 2 wherein the concentration of polymer in said solution is from about 10% to about 0.1% by weight.

4. The method of claim 1 wherein said polymer has a molecular weight of 100,000 and the polymer concentration is from about 2% to about 5% by weight.

5. The method of claim 1 wherein said polymer has a molecular weight of about 1,000,000 and a concentration of from about 0.5% to about 5.0% by weight.

6. The method of claim 1 wherein said complexing ion is included in an aqueous solution in an amount of from 0.5 to about 10% by weight based on the weight of the polymer.

7. The method of claim 1 wherein said complexing ion is selected from the group consisting of Cu(II), Al(III), Cr(III), Ti(IV), Zr(IV) and mixtures thereof.

8. The method of claim 1 wherein said polymer solution is prepared by dissolving said polymer in water at a temperature of not greater than about 120° F.

* * * * *